United States Patent
Zhang et al.

(10) Patent No.: US 11,127,979 B2
(45) Date of Patent: Sep. 21, 2021

(54) POLYFLUORINATED CARBONATE ELECTROLYTE FOR HIGH-VOLTAGE LITHIUM BATTERIES

(71) Applicant: UCHICAGO ARGONNE, LLC, Chicago, IL (US)

(72) Inventors: Zhengcheng Zhang, Naperville, IL (US); Adam P. Tornheim, Darien, IL (US); Meinan He, Willowbrook, IL (US); Jason Croy, Plainfield, IL (US)

(73) Assignee: UCHICAGO ARGONNE, LLC, Chicago, IL (US)

( * ) Notice: Subject to any disclaimer, the term of this patent is extended or adjusted under 35 U.S.C. 154(b) by 225 days.

(21) Appl. No.: 15/923,687

(22) Filed: Mar. 16, 2018

(65) Prior Publication Data
US 2019/0288340 A1 Sep. 19, 2019

(51) Int. Cl.
| | |
|---|---|
| *H01M 10/0525* | (2010.01) |
| *H01M 10/0569* | (2010.01) |
| *H01M 4/133* | (2010.01) |
| *H01M 4/131* | (2010.01) |
| *H01M 4/02* | (2006.01) |

(52) U.S. Cl.
CPC ....... *H01M 10/0569* (2013.01); *H01M 4/131* (2013.01); *H01M 4/133* (2013.01); *H01M 10/0525* (2013.01); *H01M 2004/027* (2013.01); *H01M 2004/028* (2013.01); *H01M 2300/0034* (2013.01); *H01M 2300/0037* (2013.01)

(58) Field of Classification Search
CPC .. H01M 10/0569; H01M 4/131; H01M 4/133; H01M 10/0525; H01M 10/052; H01M 2300/004; H01M 2300/0034; H01M 2300/0037; H01M 2004/027; H01M 10/0568; H01M 2004/028
See application file for complete search history.

(56) References Cited

U.S. PATENT DOCUMENTS

| | | | |
|---|---|---|---|
| 7,842,417 B2 * | 11/2010 | Kim | H01M 10/0567 429/188 |
| 8,377,598 B2 | 2/2013 | Wakita et al. | |
| 9,240,616 B2 | 1/2016 | Koh et al. | |

(Continued)

FOREIGN PATENT DOCUMENTS

| | | | |
|---|---|---|---|
| JP | 2007188873 | * | 7/2007 |
| WO | 2011036283 A2 | | 3/2011 |

OTHER PUBLICATIONS

Jow, T.R. et al. (eds), Electrolytes for Lithium and Lithium-Ion Batteries, Nonaqueous Electrolytes and Advances in Additives, Chapter 3, pp. 167-190 (2014).

(Continued)

*Primary Examiner* — Alexander Usyatinsky
(74) *Attorney, Agent, or Firm* — Olson & Cepuritis, Ltd.

(57) ABSTRACT

A non-aqueous solvent composition for a lithium battery comprises a fluorinated solvent mixture that consists essentially of a 1,2-difluoroethylene carbonate and a fluoro-substituted dialkyl carbonate in a respective weight ratio of about 1:3 to about 1:1, and optionally up to about 30 wt % of an additional organic solvent. An electrolyte for a lithium ion battery comprises a lithium salt dissolved in a non-aqueous solvent composition comprising the fluorinated solvent mixture.

15 Claims, 5 Drawing Sheets

(56) References Cited

U.S. PATENT DOCUMENTS

| | | | | |
|---|---|---|---|---|
| 2012/0177987 A1* | 7/2012 | Olschimke | ........... | C07D 317/36 |
| | | | | 429/189 |
| 2014/0045078 A1* | 2/2014 | Eicher | ............... | H01M 10/0567 |
| | | | | 429/403 |
| 2015/0221987 A1* | 8/2015 | Yawata | ................. | H01M 4/485 |
| | | | | 429/338 |
| 2018/0219259 A1* | 8/2018 | Kawai | ............... | H01M 10/0568 |

OTHER PUBLICATIONS

Kobayashi, M. et al., Development of Direct Fluorination Technology for Application to Materials for Lithium Battery, Journal of Fluorine Chemistry 120, 105-110 (2003).

Long, B.R. et al., Enabling High-Energy, High-Voltage Lithium-Ion Cells: Standardization of Coin-Cell Assembly, Electrochemical Testing, and Evaluation of Full Cells, Journal of the Electrochemical Society, 163 (14), A2999-A3009 (2016).

Long, B.R. et al., Advances in Stabilizing 'Layered-Layered' $xLi_2MnO_3 \cdot (1-x)LiMO_2$ (M=Mn, Ni, Co) Electrodes With a Spinel Component, Journal of the Electrochemical Society, 161 (14), A2160-A2167 (2014).

Xia, J. et al., Some Fluorinated Carbonates as Electrolyte Additives for $Li(Ni_{0.4}Mn_{0.4}Co_{0.2})O_2$/Graphite Pouch Cells, Journal of the Electrochemical Society, 163 (8), A1637-A1645 (2016).

\* cited by examiner

POLYFLUORINATED CARBONATE ELECTROLYTE FOR HIGH-VOLTAGE LITHIUM BATTERIES

The United States Government has rights in this invention pursuant to Contract No. DE-AC02-06CH11357 between the United States Government and UChicago Argonne, LLC representing Argonne National Laboratory.

FIELD OF THE INVENTION

This invention relates to electrolyte materials for lithium electrochemical cells and batteries. More particularly, this invention relates to electrolyte solvent mixture, as well as lithium battery electrolytes, electrochemical cells, and batteries comprising the solvent mixtures.

BACKGROUND

Lithium-ion (Li-ion) batteries are ubiquitous power sources for portable consumer electronics and are currently the only feasible energy storage chemistries being employed in electric vehicles (EVs) and aimed for large-scale application in the near future due to their high energy density and long cycle life. To further extend the current electric-drive range of EVs, new generation Li-ion chemistries with exceptionally high energy densities and high power density are being actively explored. A common approach for high energy density Li-ion cells is to explore high capacity cathode materials (>250 mAh/g) such as layered-layered composite $xLi_2MnO_3 \cdot (1-x)LiMO_2 (M=Mn, Ni, Co; 0<x<0.5)$, $Li_2FePO_4F_4$ and $Li_2FeSiO_4$, which reportedly yield capacities of 280, 292 and 323 mAh/g, respectively, and high working potential cathode materials including olivine-type $LiNiPO_4$ and $LiCoPO_4$ and spinel-type $LiNi_{0.5}Mn_{1.5}O_4$ (LNMO) and $LiCoMnO_4$ coupled with a low-potential anode material including graphite, silicon, and lithium. However, high energy densities of such cells can only be realized at potentials above about 4.5 V vs. $Li^+/Li$. In addition, the well-studied Ni-rich layered lithium nickel-manganese-cobalt oxide (NMC) materials (e.g., $LiNi_{0.5}Mn_{0.3}Co_{0.2}O_2$; also known as NMC532; 287 mAh/g theoretical capacity) could offer both high capacity and high voltage if they could be operated at higher potentials (about 4.4-4.8 V) instead of 4.2 or 4.3 V vs $Li^+/Li$. Nevertheless, these types of batteries suffer from large active lithium loss resulting in fast deterioration in capacity retention with repeated cycling at such potentials mainly due to the instability of the electrode/electrolyte interface at high charging voltages.

Designed for 4 V-class Li-ion cells, conventional electrolytes are thermodynamically unstable at the charged cathode surface above about 4.3 V due to the high energy level of the highest occupied molecular orbital (HOMO) of the solvents, especially the commonly used solvent ethylene carbonate (EC; a cyclic carbonate). EC-free electrolytes with $LiPF_6$ salt and a solid electrolyte interphase (SEI) formation additives such as vinylene carbonate (VC), vinyl ethylene carbonate (VEC), or lithium difluoro(oxalate) borate (LiDFOB), reportedly provide improved voltage stability on the high voltage NMC cathode and stabilized graphite surface. Complete oxidative decomposition of organic carbonates leads to generation of CO, $CO_2$, and $H_2$ gasses as well $H_2O$, which causes severe cell swelling issues and vigorous transition metal (TM) dissolution due to the generation of HF from the hydrolysis reaction of $H_2O$ and $LiPF_6$ in the electrolyte. TM dissolution has been reported in 4 V-class Li-ion cells and largely attributed to the trace amounts of moisture existing in the initial electrolyte. Mitigation of TM dissolution is critical for maintaining the performance of low-potential anode materials where dissolution is significantly worse when cycling voltages are elevated.

EC-free, $LiPF_6$-free electrolytes with other carbonate solvents, such as an electrolyte based on a 1:1 molar ratio of dimethyl carbonate (DMC)/lithium bis(fluorosulfonyl)imide (LiFSI), have shown some promise at preventing dissolution of TMs at around 5 V, reportedly improving the cycling stability of a high voltage $LiNi_{0.5}Mn_{1.5}O_4$/graphite cell with high rate capability. However, the long term cycling durability is problematic due to the presence of oxidatively unstable DMC solvent and the fragile SEI formed mainly by LiFSI. More efforts have been shifted to non-carbonate electrolytes such as sulfones, ionic liquids, and dinitriles attempting to improve the oxidation stability. The main challenge associated with these non-carbonate solvents are lack of SEI formation capability on the graphite anode, or, the formed SEI is not resilient enough to prevent further reduction of solvents.

Besides anode/electrolyte interfacial instability, other issues such as corrosion of aluminum current collectors, low solubility of lithium salts, and strong solvation with TM ions render the non-carbonate electrolytes unsuitable for high voltage applications. Another approach has been to employ sacrificial electrolyte additives that preferentially oxidize and deposit or form chemical bonds with metal oxide surface functionality forming a passivation layer (also called cathode-electrolyte-interphase, CEI) to afford a reversible $Li^+$intercalation chemistry in the coveted 5-V region, however, the improvements are still unsatisfactory and the mechanisms and effectiveness of these additives are not well understood.

There is an ongoing need for high voltage (e.g., 4-5 V), high energy, Li-ion battery electrolytes with one or more improved characteristic, such as better stability, lower levels of TM dissolution, reduced gas generation, and reduced flammability. Due to its dendrite growth and associated safety concern, lithium metal anode has formidable challenges to be met before it can be used in the high performance lithium-based battery for a variety of applications. The electrolyte solvents and electrolytes described herein address these needs.

SUMMARY OF THE INVENTION

Developing a high-voltage enabling electrolyte is extremely important for the success of next generation high-energy/high-voltage lithium-ion batteries for both consumer electronics and electric vehicles. Designed for a 4V-class lithium-ion chemistry, conventional electrolytes suffer from oxidation instability on the charge cathode/electrolyte interface at high charging voltages, which leads to severe TM dissolution and rapid capacity fading. The electrolyte compositions described herein comprise a mixture of polyfluorinated carbonates that can inhibit the dissolution of TMs from the cathode and thus provide superior protection to graphite anode by the formation of a resilient solid-electrolyte-interphase (SEI) which is resistant to TM attack and the active lithium loss due to TM-related side reactions at graphitic anodes.

In addition, the electrolyte compositions described herein could effectively passivate the lithium metal surface by the formation of a unique SEI thus affords a lithium metal cell with high coulombic efficiency and cyclability.

New solvent compositions that are useful for lithium battery applications are described herein, which comprise mixtures of cyclic and linear fluorinated carbonates. In one embodiment, a non-aqueous solvent composition for a lithium-ion battery comprises a fluorinated solvent mixture that consists of or consists essentially of a 1,2-difluoroethylene carbonate (also known as DFEC; and 4,5-difluoro-1,3-dioxolan-2-one) and a fluoro-substituted dialkyl carbonate (e.g., such as bis(2,2,2-trifluoroethyl) carbonate (also known as hexafluorodiethyl carbonate or HFDEC), 2-fluoroethyl methyl carbonate (FEMC), and the like) in a weight ratio of about 1:3 to about 1:1; or in some embodiments, in a respective weight ratio of about 3:7 to about 1:1. In some embodiments, the solvent composition comprises the fluorinated solvent mixture and up to about 30 percent by weight (wt %) of one or more additional non-aqueous solvents.

An electrolyte for a lithium battery comprises a lithium salt (e.g., LiPF$_6$) dissolved in a non-aqueous solvent comprising a polyfluorinated solvent mixture consisting of, or consisting essentially of, a 1,2-difluoroethylene carbonate and a fluoro-substituted dialkyl carbonate (e.g., such as HFDEC, FEMC, and the like) in a respective weight ratio of about 1:3 to about 1:1; or in some embodiments, in a respective weight ratio of about 3:7 to about 1:1.

In one particular embodiment, a polyfluorinated electrolyte comprised of 1.0 M LiPF$_6$ in 1,2-difluoroethylene carbonate (DFEC)/bis(2,2,2-trifluoroethyl) carbonate (HFDEC) (3:7 weight ratio) in a high-voltage LiNi$_{0.5}$Mn$_{0.3}$Co$_{0.2}$O$_2$ (NMC532)/graphite cell (4.6 V vs Li$^+$/Li) exhibited superior long term cycling stability and significantly enhanced safety. The 1,2-difluoroethylene carbonate is believed to participate in LiPF$_6$ salt solvation and SEI formation on anodes, while the bis(2,2,2-trifluoroethyl) carbonate is believed to act as an anti-oxidation enhancer and electrolyte diluent. This superior electrolyte not only stabilizes the high voltage cathode surface structure with significantly mitigated TM dissolution, but also forms a highly stable and resilient SEI, which is resistant to TM attack on the graphite anode side. This electrolyte provides remarkable and unexpected long-term cycling performance of a high voltage NMC532/graphite cell between 4.5-3.0 V. Equally notable, conventional electrolytes are extremely flammable, while the formulated polyfluorinated electrolyte system is substantially non-flammable, making the Li-ion battery much safer under abuse conditions. Similar discharge capacity results were obtained with 1:1 DFEC:HFDEC, and 3:7 DFEC:FEMC, while 1:4 DFEC:HFDEC surprisingly exhibited much poorer performance than 1:1 DFEC:HFDEC or 3:7 DFEC:HFDEC. Selected non-limiting embodiments of the electrolytes, cells and batteries described herein are summarized below to illustrate certain features and aspects of the invention or inventions described herein.

Embodiment 1 comprises a non-aqueous solvent composition for a lithium battery composed of a fluorinated solvent mixture consisting essentially of a 1,2-difluoroethylene carbonate and a fluoro-substituted dialkyl carbonate in a respective weight ratio of about 1:3 to about 1:1.

Embodiment 2 comprises the composition of Embodiment 1, wherein the 1,2-difluoroethylene carbonate and the a fluoro-substituted dialkyl carbonate are present in the composition in a respective weight ratio of about 3:7 to about 1:1.

Embodiment 3 comprises the composition of Embodiment 1, wherein the solvent composition comprises up to about 30 wt % of another non-aqueous solvent in addition to the 1,2-difluoroethylene carbonate and the fluoro-substituted dialkyl carbonate.

Embodiment 4 comprises the composition of any one of Embodiments 1 to 3, wherein the 1,2-difluoroethylene carbonate comprises trans-1,2-difluoroethylene carbonate.

Embodiment 5 comprises the composition of any one of Embodiments 1 to 4, wherein the fluoro-substituted dialkyl carbonate comprises one or more compound selected from the group consisting of bis(2,2,2-trifluoroethyl) carbonate and 2-fluoroethyl methyl carbonate (FEMC).

Embodiment 6 comprises the composition of any one of Embodiments 1 to 5, wherein the non-aqueous solvent composition comprises up to about 30 wt % of another, different, non-aqueous solvent in addition to the 1,2-difluoroethylene carbonate and the fluoro-substituted dialkyl carbonate.

Embodiment 7 comprises a non-aqueous electrolyte for a lithium electrochemical cell comprising a lithium salt dissolved in a non-aqueous solvent composition comprising a fluorinated solvent mixture consisting essentially of a 1,2-difluoroethylene carbonate and a fluoro-substituted dialkyl carbonate in a respective weight ratio of about 1:3 to about 1:1.

Embodiment 8 comprises the electrolyte of Embodiment 7, wherein the 1,2-difluoroethylene carbonate and the fluoro-substituted dialkyl carbonate are present in the non-aqueous solvent mixture in a respective weight ratio of about 3:7 to about 1:1.

Embodiment 9 comprises the electrolyte of any one of Embodiments 7 to 8, wherein the non-aqueous solvent composition comprises up to about 30 wt % of an additional non-aqueous solvent.

Embodiment 10 comprises the electrolyte of any one of Embodiments 7 to 9, wherein the 1,2-difluoroethylene carbonate comprises trans-1,2-difluoroethylene carbonate.

Embodiment 11 comprises the electrolyte of any one of Embodiments 6 to 10, wherein the fluoro-substituted dialkyl carbonate comprises one or more compound selected from the group consisting of bis(2,2,2-trifluoroethyl) carbonate and 2-fluoroethyl methyl carbonate (FEMC).

Embodiment 12 comprises the electrolyte of any one of Embodiments 7 to 11, wherein the lithium salt comprises at least one salt selected from the group consisting of lithium bis(trifluoromethanesulfonyl)imide (LiTFSI), lithium 2-trifluoromethyl-4,5-dicyanoimidazolate (LiTDI), lithium 4,5-dicyano-1,2,3-triazolate (LiDCTA), lithium trifluoromethanesulfonate (LiTf), lithium perchlorate (LiClO$_4$), lithium bis(oxalato)borate (LiBOB), lithium difluoro(oxalato)borate (LiDFOB), lithium tetrafluoroborate (LiBF$_4$), lithium hexafluorophosphate (LiPF$_6$), lithium thiocyanate (LiSCN), lithium bis(fluorosulfonyl)imide (LiFSI), lithium bis(pentafluoroethylsulfonyl)imide (LiBETI), lithium tetracyanoborate (LiB(CN)$_4$), and lithium nitrate.

Embodiment 13 comprises the electrolyte of any one of Embodiments 7 to 11, wherein the lithium salt comprises LiPF$_6$.

Embodiment 14 comprises the electrolyte of any one of Embodiments 7 to 13, wherein the lithium salt is present in the electrolyte at a concentration in the range of about 0.1 M to about 3 M.

Embodiment 15 comprises a non-aqueous electrolyte for a lithium electrochemical cell comprising about 0.5 M to about 2 M LiPF$_6$ dissolved in a non-aqueous solvent composition comprising a fluorinated solvent mixture consisting essentially of a 1,2-difluoroethylene carbonate and a fluoro-substituted dialkyl carbonate in a respective weight ratio of about 1:3 to about 1:1.

Embodiment 16 comprises the electrolyte of Embodiment 15, wherein the 1,2-difluoroethylene carbonate and the fluoro-substituted dialkyl carbonate are present in the non-aqueous solvent mixture in a respective weight ratio of about 3:7 to about 1:1.

Embodiment 17 comprises the electrolyte of any one of Embodiments 15 to 16, wherein the 1,2-difluoroethylene carbonate comprises trans-1,2-difluoroethylene carbonate.

Embodiment 18 comprises an electrochemical cell comprising an anode, a cathode, and an electrolyte of any one of Embodiments 7 to 17 contacting the anode and the cathode.

Embodiment 19 comprises the electrochemical cell of Embodiment 18, wherein the anode comprises metallic lithium or a graphite material and the cathode comprises a lithium metal oxide material.

Embodiment 20 comprises a battery comprising a plurality of electrochemical cells of any one of embodiments 18 and 19, electrically connected in series, in parallel, or in both series and parallel.

The solvent compositions and electrolytes described herein provide unexpected benefits, particularly when used with $LiPF_6$ as the electrolyte salt and with NMC cathode materials, including improved SEI on the graphite anode surface, reduced TM dissolution from the cathode, and improved cycling stability relative to a state of the art Gen 2 electrolyte described herein.

DETAILED DESCRIPTION OF PREFERRED EMBODIMENTS

New and useful electrolyte solvents and electrolyte compositions for lithium ion batteries are described herein. A non-aqueous solvent composition for a lithium battery comprises a fluorinated solvent mixture comprising, consisting essentially of, or consisting of a 1,2-difluoroethylene carbonate and a fluoro-substituted dialkyl carbonate (e.g., such as HFDEC, FEMC, and the like), e.g., in a respective weight ratio of about 1:3 to about 1:1. In some embodiments the non-aqueous solvent composition optionally can include a minor amount (e.g., up to about 30 wt %) of one or more other non-aqueous solvents (i.e., solvents other than 1,2-difluoroethylene carbonate and the fluoro-substituted dialkyl carbonate), if desired. An electrolyte for a lithium ion battery comprises a lithium salt (e.g., $LiPF_6$) dissolved in the non-aqueous solvent composition. Fluorinated carbonated carbonate compounds possess all the desirable properties of the regular carbonate with additional features on oxidation stability, low melting point, excellent low temperature performance, non-flammability, and excellent wettability with separator and electrode. These unique features can all be imparted by the presence of the fluorine substituents when specific combinations of fluorinated carbonates are utilized.

In some preferred embodiments, the 1,2-difluoroethylene carbonate is present in the fluorinated solvent mixture at a concentration of 50 percent by weight (wt %) or less and the fluoro-substituted dialkyl carbonate is present at a concentration of 50 wt % or greater. For example the 1,2-difluoroethylene carbonate may present at a concentration of about 25 wt % to about 50 wt %, and the fluoro-substituted dialkyl carbonate may be present at a concentration of about 50 wt % to about 75 wt %. Alternatively, the 1,2-difluoroethylene carbonate may present at a concentration of about 30 wt % to about 50 wt %, and the fluoro-substituted dialkyl carbonate may be present at a concentration of about 50 wt % to about 70 wt %. In one preferred embodiment, the 1,2-difluoroethylene carbonate and the fluoro-substituted dialkyl carbonate are present in the fluorinated solvent mixture in a respective weight ratio of about 3:7 to about 1:1.

In some electrolyte embodiments, the non-aqueous solvent composition consists of the fluorinated solvent mixture; whereas in some other embodiments, the non-aqueous solvent comprises the fluorinated solvent mixture and up to about 30 wt % of another non-aqueous solvent that is different from the 1,2-difluoroethylene carbonate and the fluoro-substituted dialkyl carbonate.

Non-limiting examples of lithium salts useful in the electrolyte compositions described herein include, e.g., lithium bis(trifluoromethanesulfonyl)imide (LiTFSI), lithium 2-trifluoromethyl-4,5-dicyanoimidazolate (LiTDI), lithium 4,5-dicyano-1,2,3-triazolate (LiDCTA), lithium trifluoromethanesulfonate (LiTf), lithium perchlorate (LiClO$_4$), lithium bis(oxalato)borate (LiBOB), lithium difluoro (oxalato)borate (LiDFOB), lithium tetrafluoroborate (LiBF$_4$), lithium hexafluorophosphate (LiPF$_6$), lithium thiocyanate (LiSCN), lithium bis(fluorosulfonyl)imide (LiFSI), lithium bis(pentafluoroethylsulfonyl)imide (LiBETI), lithium tetracyanoborate (LiB(CN)$_4$), lithium nitrate, combinations of two or more thereof, and the like. The lithium salt can be present in the electrolyte at any concentration suitable for lithium-ion battery applications, which concentrations are well known in the secondary battery art. In some embodiments, the lithium salt is present in the electrolyte at a concentration in the range of about 0.1 M to about 3 M, e.g., about 0.5 M to about 2 M, or 1 M to about 1.5 M. A preferred lithium salt is $LiPF_6$, e.g., at a concentration of about 1 M.

Optionally, the electrolytes described herein may comprise up to about 30 wt % (e.g., about 10 to about 20 wt %) of an additional non-aqueous solvent included in the fluorinated solvent mixture. Non-limiting examples of such additional solvents include selected from one or more of an ether, a carbonate ester, a nitrile, a sulfoxide, a sulfone, a fluoro-substituted linear dialkyl carbonate, a fluoro-substituted cyclic alkylene carbonate, a fluoro-substituted sulfolane, and a fluoro-substituted sulfone. For example, the solvent can comprise an ether (e.g., glyme or diglyme), a linear dialkyl carbonate (e.g., dimethyl carbonate (DMC), diethyl carbonate (DEC), ethyl methyl carbonate (EMC) and the like), a cyclic alkylene carbonate (ethylene carbonate (EC), propylene carbonate (PC) and the like), a sulfolane (e.g., sulfolane or an alkyl-substituted sulfolane), a sulfone (e.g., a dialkyl sulfone such as a methyl ethyl sulfone), a fluoro-substituted linear dialkyl carbonate, a fluoro-substituted cyclic alkylene carbonate, a fluoro-substituted sulfolane, and a fluoro-substituted sulfone. The additional solvent can comprise a single solvent compound or a mixture of two or more solvent compounds.

The fluoro-substituted dialkyl carbonate comprises a dialkyl carbonate having at least one fluoro substituent on at least one of the alkyl groups thereof. For example, the fluoro-substituted dialkyl carbonate can include 1, 2, or more fluoro substituents. In some preferred embodiments, the alkyl groups of the fluoro-substituted dialkyl carbonate are $C_1$ to $C_6$ alkyl groups, which can be a linear or branched (preferably linear) alkyl (e.g., methyl, ethyl, propyl, isopropyl, butyl, isobutyl, tert-butyl, pentyl, hexyl, and the like). At least one of the alkyl groups of the fluoro-substituted dialkyl carbonate includes a fluoro substituent (e.g., 1, 2, 3, or more fluoro substituents). In some embodiments, both alkyl groups include at least one fluoro substituent. In some embodiments, one or both of the alkyl groups of the fluoro-substituted dialkyl carbonate is a perfluoroalkyl group (e.g., a perfluoro $C_1$ to $C_6$ alkyl group, which can be a linear or branched (preferably linear) perfluoro alkyl (e.g., trifluoromethyl, pentafluoroethyl, heptafluoropropyl, heptafluoroisopropyl, nonafluorobutyl, nonafluoroisobutyl, nonafluoro-tert-butyl, undecafluoropentyl, tridecafluorohexyl, and the like).

The electrolyte compositions described herein also can optionally comprise an additive such as those described in Jow et al. (Eds.), *Electrolytes for Lithium and Lithium-ion Batteries*; Chapter 3, pp. 167-182; Springer; New York, N.Y. (2014), which is incorporated herein by reference in its entirety, to provide benefits such as SEI, cathode protection, Li salt stabilization, thermal stability, safety enhancement, overpotential protection, corrosion inhibition, and the like. The additive can be present in the electrolyte at any concentration, but in some embodiments is present at a concentration in the range of about 0.0001 M to about 0.5 M. In some embodiments, the additive is present in the electrolyte at a concentration in the range of about 0.001 M to about 0.25 M, or about 0.01 M to about 0.1 M.

The electrolyte solvents and electrolytes described herein can be incorporated in a lithium-ion electrochemical cell comprising a positive electrode (cathode), a negative electrode (anode), and a porous separator between the cathode and anode, with the electrolyte in contact with both the anode and cathode, as is well known in the battery art. The anode can comprise any anode active material useful for lithium batteries, such as lithium metal, graphite and silicon materials. The cathode can comprise any cathode active material useful for lithium batteries, such as lithium metal oxides, lithium transition metal phosphates, and the like. A battery can be formed by electrically connecting two or more such electrochemical cells in series, parallel or a combination of series and parallel. The electrolyte can be utilized with any anode or cathode compositions useful in lithium batteries. Electrochemical cell and battery designs and configurations, anode and cathode materials, as well as electrolyte salts, solvents and other battery or electrode components (e.g., separator membranes, current collectors), which can be used in the electrolytes, cells and batteries described herein, are well known in the lithium battery art, e.g., as described in *Lithium Batteries Science and Technology*, Gholam-Abbas Nazri and Gianfranco Pistoia, Eds., Springer Science+Business Media, LLC; New York, N.Y. (2009), which is incorporated herein by reference in its entirety.

The solvents described herein can be utilized with any combination of anode and cathode in any type of rechargeable battery system that utilizes a non-aqueous electrolyte. The electrolytes described herein can be utilized in any rechargeable lithium battery system with a graphite or silicon-based anode and any lithium metal oxide cathode material or other cathode active material used in lithium ion batteries. In some embodiments, the cathode can comprise a layered lithium metal oxide cathode material such as $LiMO_2$ wherein M=Mn, Ni, Co or a combination thereof (e.g., a layered lithium nickel-manganese-cobalt oxide such as $LiNi_{0.5}Mn_{0.3}CO_{0.2}O_2$, and similar materials). In other embodiments, the cathode can comprise a spinel lithium metal oxide such as $Li_2M'_2O_4$ wherein M'=Mn, Ni, Co or a combination thereof; a structurally integrated 'layered-layered' (LL) lithium metal oxide such as $xLi_2MnO_3 \cdot (1-x)LiMn_yM_{1-y}O_2$ wherein $0<x<1$, $0 \le y \le 1$, M=Ni, Co, or Ni and Co; a structurally integrated 'layered-spinel' (LS) lithium metal oxide such as $xLi_2MnO_3 \cdot (1-x)Li_2Mn_yM_{2-y}O_4$ wherein $0<x<1$, $0 \le y \le 2$, M=Ni, Co, or Ni and Co; a structurally integrated 'layered-layered-spinel' (LLS) lithium metal oxide such as $z[xLi_2MnO_3 \cdot Li_2Mn_yM_{2-y}O_4] \cdot (1-z)Li_2M'_2O_4$ wherein $0<x<1$, $0 \le y \le 1$, $0<z<1$, M=Ni, Co, or Ni and Co, and M'=Mn, Ni, Co or a combination thereof (e.g., $0.85[0.25Li_2MnO_3 \cdot (0.75)LiMn_{0.375}Ni_{0.375}Co_{0.25}O_2]$ $\cdot 0.15Li_2M'_2O_4$ wherein M'=a combination Mn, Ni, and Co); or any other cathode active material used in lithium ion batteries.

As used herein, a structurally-integrated composite metal oxide is a material that includes domains (e.g., locally ordered, nano-sized or micro-sized domains) indicative of different metal oxide compositions having different crystalline forms (e.g., layered or spinel forms) within a single particle of the composite metal oxide, in which the domains share substantially the same oxygen lattice and differ from each other by the elemental and spatial distribution of metal ions in the overall metal oxide structure. Structurally-integrated composite metal oxides are different from and generally have different properties than mere mixtures of two or more metal oxide components (for example, mere mixtures do not share a common oxygen lattice).

The following non-limiting examples are provided to illustrate certain aspects and features of the solvent compositions, electrolytes, electrochemical cells, and batteries described herein.

EXAMPLES

Ex. 1. Methods

Synthesis of HFDEC. The symmetric fluorinated linear carbonates were synthesized following a published procedure (He, M.; Hu, L.; Xue, Z.; Su, C. C.; Redfern, P.; Curtiss, L. A.; Polzin, B.; von Cresce, A.; Xu, K.; Zhang, Z., "Fluorinated Electrolytes for 5-V Li-Ion Chemistry: Probing Voltage Stability of Electrolytes with Electrochemical Floating Test." *J. of The Electrochem. Soc.* 2015, 162, A1725-A1729). In a typical procedure for bis(trifluoroethyl) carbonate (HFDEC), 2,2,2-trifluoroethanol (18.5 g, 0.185 mol, 6.17 equiv), triethylamine (20.2 g, 0.2 mol, 6.67 equiv), and 4-dimethylaminopyridine (Sigma-Aldrich, 36 mg, 0.3 mmol, 1% mol) were mixed together in a round-bottom flask and cooled to about 0° C. A solution of triphosgene (8.9 g, 0.03 mol, 1 equiv) in $CH_2Cl_2$ was added into the mixture dropwise via a syringe pump over the course of about 8 hours (h). The mixture was then allowed to warm up to ambient temperature and stirred for about 48 h. The reaction was then quenched with 1N HCl, and the product was extracted with $CH_2Cl_2$ and washed further with aqueous HCl and then with brine solution. The crude product was distilled to remove $CH_2Cl_2$, dried with 4 Å molecular sieves, and then fractional distilled twice to afford the pure product (99.1% by gas chromatography) with an isolated yield of 39% and 15 ppm water content as measured by Karl-Fischer titration.

Electrolyte and electrode preparation. An electrolyte comprising 1.2 M $LiPF_6$ dissolved in ethylene carbonate (EC) and ethyl methyl carbonate (EMC) in 3:7 ratio by weight, designated as "Gen 2" electrolyte, was purchased from Tomiyama Pure Chemical Industries. 1,2-Difluoroethylene carbonate (DFEC) was purchased from Solvay and was purified by drying with 4 Å molecular sieve and vacuum distillation before use. The fluorinated electrolyte was prepared by dissolving a sufficient quantity of $LiPF_6$ in a mixture of DFEC and HFDEC (3:7 ratio by weight) to achieve a molar concentration of $LiPF_6$ of about 1.0 M. The electrolyte preparation was performed in an Ar-filled glovebox with controlled moisture content<5 ppm. The cathode was made of about 90 wt % NMC532, 5 wt % carbon black C45, and 5 wt % Solvay polyvinylidene fluoride (PVDF) 5130 binder coated on aluminum foil. The total material loading was in the range of about 9.12 to about 9.17 mg/cm$^2$. The graphite anode was predominately graphite (e.g., 89-92 wt %), with about 4 wt % SUPER P-Li, about 6 wt % Kureha PVDF 9300 binder, and a small amount (e.g., about 0.2 wt %) of oxalic acid coated on copper foil. The active material loading of the anode was between about 5 to 6 mg/cm$^2$. The effective diameters of cathode, anode and separator were 14 mm, 15 mm and 16 mm, respectively. The separator for each cell was a polyolefin separator. Coin cells were assembled in the argon glove box.

Electrochemical impedance spectroscopy. Impedance measurements were tested at 30° C., maintained by an oven. The impedance spectra were collected using a SOLARTRON impedance analyzer in the frequency range of about 1 M Hz to 0.01 Hz, with an amplitude of about 10 mV.

Electrode morphology characterization. The morphologies of the electrodes after cycling were investigated by scanning electron microscopy (SEM) and energy dispersive X-ray spectroscopy using a Hitachi 5-4700-II microscope in the Electron Microscopy Center, Argonne National Laboratory.

X-ray diffraction analysis. Synchrotron X-ray Diffraction (SXRD) was performed to quantify the structure and compositions of electrode materials at beam-line 17-BM at Advanced Photon Source (APS) at Argonne National Laboratory using X-ray wavelength of 0.72768 Å. Samples were attached to KAPTON tapes and measured in transmission mode. A PERKINELMER amorphous silicon flat panel detector was used to collect two-dimensional XRD data. The 2D data was integrated to conventional plots of intensity versus $2\theta$, which was converted to $2\theta$ values at X-ray wavelength of 1.5406 Å (Cu K$\alpha$ source), for the convenience of comparison with a reference database.

HRTEM. Atomic resolution HAADF imaging and electron energy loss spectroscopy were performed using JEOL JEM-ARM200CF scanning tunneling electron microscope (STEM) equipped with a cold field emission gun with 0.78 Å spatial resolution and a GATAN ENFINA EELS system. A 22 mrad probe convergence angle was used to perform STEM imaging. HAADF detector with 90 mrad inner-detector angle was utilized to obtain Z-contrast atomic resolution images. Spectroscopy was done with 0.3 eV/channel dispersion and with a 2 mm detector aperture. Full-width half maximum of zero loss peak was measured 0.9 eV, which determines the energy resolution of the obtained spectra. Some HAADF images were filtered using a HRTEM filter.

ICP-MS. All coin cell disassembly was performed in an Argon glove box. The "stack" (stainless steel spaces, anode, separator, cathode) was removed from the coin cell and placed in a polypropylene falcon tube containing about 5.0 mL anhydrous dimethyl carbonate (DMC). The tube was gently stirred for approx. 30 seconds at which point the stack was carefully removed from solution. The DMC in the falcon tube was then allowed to evaporate outside the glove box for several days at which point the falcon tube was capped and submitted for analysis. The DMC-rinsed electrodes were allowed to dry for 10 minutes, placed in polypropylene vials, capped (with non-foil caps) and submitted for analysis.

Samples were submitted as coatings on copper foil disks. The coating on each specimen was scraped from the copper foil and transferred to a weighed 25-mL platinum crucible. The mass of the crucible plus sample was measured and then the crucible was heated in a laboratory furnace at 600° C. for about 16 h to burn off organic constituents and carbon. Each residue was then dissolved in the crucible using about 1 mL DI water, 2 mL OPTIMA Grade nitric acid, and 0.1 mL OPTIMA Grade hydrofluoric acid. Solutions were transferred to 50-mL polypropylene centrifuge tubes and diluted to 25 mL for ICP-MS analysis. Results are reported relative to the original (not ignited) sample mass, which was determined from the mass of coating recovered from scraping the specimen by subtracting copper in the material (copper was presumed to come from the electrode substrate; it was measured in the residue along with the requested elements).

Solution samples were analyzed by ICP-MS to determine the concentrations of the requested elements. Measurements were made with a PERKIN ELMER/SCIEX ELAN DRC-II spectrometer calibrated with standards prepared from NIST traceable solutions procured from Ultra Scientific, North Kingstown, R.I. Reported data were calculated from the ICP-MS concentration data, the volume of the prepared solution, and the mass of sample taken.

Electrolyte samples were evaporated in polypropylene centrifuge tube and submitted as dried salts in these tubes. The analysis laboratory dissolved the salts in 10 mL of 2% nitric acid (OPTIMA Grade, Fisher Scientific).

Anode samples were submitted as coatings on copper foil disks. The coating on each specimen was scraped from the copper foil and transferred to a weighed 25-mL quartz beaker. Mass of the beaker plus sample was measured and then the beaker was heated in a laboratory furnace at 700° C. for about 16 h to burn off organic constituents and carbon. Each residue was dissolved in the beaker using about 1 mL DI water, 2 mL OPTIMA Grade nitric acid, and 3 mL OPTIMA Grade hydrochloric acid. Solutions were transferred to 15-mL polypropylene centrifuge tubes and diluted to 10 mL for ICP-MS analysis. Results are reported relative to the original (not ignited) sample mass, based on the mass of coating recovered from scraping the specimen.

Solutions prepared from the residues were analyzed by ICP-MS to determine the concentrations of the requested elements. Measurements were made with a PERKIN ELMER/SCIEX ELAN DRC-II spectrometer calibrated with standards prepared from NIST traceable solutions procured from Ultra Scientific, North Kingstown, R.I. Reported data were calculated from the ICP-MS concentration data, the volume of the prepared solution, and, in the case of the anode materials, and the mass of the recovered coating.

Ex. 2. Stable Cycling of a NMC532/Graphite Cell Charged to 4.5 V

A state-of-the-art (SOA) electrolyte comprising 1.2 M $LiPF_6$ in a mixture of ethylene carbonate (EC) and ethyl methyl carbonate (EMC) (3:7 respective weight ratio), referred to herein as Gen 2 electrolyte, and a fluorinated carbonate solvent comprising 1.0 M $LiPF_6$ in a 3:7 wt/wt mixture of 1,2-difluoroethylene carbonate (DFEC) and bis (2,2,2-trifluoroethyl) carbonate (HFDEC), referred to herein as FE electrolyte (or in some cases FE-3 or FE3), were prepared and evaluated in high voltage lithium ion cells.

To examine the advantage of the formulated fluorinated electrolytes on the long-term cycling stability, a NMC532/graphite couple was cycled with a 4.5 V cut-off voltage and C/3 rate for each electrolyte. Exceptional and unexpected cycling stability coulombic efficiency (CE) for 1000 cycles was observed for the fluorinated solvent. The $1^{st}$ charge and discharge capacities for Gen 2 cell were about 237 mAh/g and about 197 mA/hg (CE 83.4%), respectively, and the capacity retention was only 29.8% at the $1000^{th}$ cycle. In contrast, despite slightly lower $1^{st}$ formation cycle CE (80.6%) and discharge capacity (191.5 mAh/g), the fluorinated electrolyte cell remarkably retained 72% of its original capacity after 1000 cycles, which is a significant improvement in cycling stability over the Gen 2 cell with high cutoff voltage. Voltage profiles of the Gen 2 cell and the fluorinated cell were evaluated for the $1^{st}$ and $2^{nd}$ formation cycle and various depth of cycling at $100^{th}$, $200^{th}$, $300^{th}$, $400^{th}$, $500^{th}$, $600^{th}$, $700^{th}$, $800^{th}$, $900^{th}$ and $1000^{th}$. Compared with fluorinated cell, the Gen 2 cell suffered from continuous capacity loss during the whole cycling process. Strikingly, a sudden loss in capacity occurred at around $180^{th}$ cycle for the Gen 2 cell indicating an abrupt change occurs at his stage. This phenomenon has been verified by multiple repetitions.

Another significant feature of the voltage profiles was the overpotential buildup for both charging and discharging for the Gen 2 cell, a reflection of resistance and impedance buildup. This is believed to be caused by the change of cathode surface structure and side reactions on the graphite anode side. After 800 cycles, a new discharge voltage plateau appeared, which is probably was due to the surface change or structure reconstruction of the cathode. In contrast, small voltage polarization was observed for the fluorinated electrolyte cell with cycling, and the shape of the discharge voltage profile remained substantially the same up to 1000 cycles, suggesting an integrated electrode surface structure and much improved electrolyte/electrode interface.

Though the NMC materials can deliver high capacity under high cutoff voltage, the high cutoff voltage may also accelerate undesired side reactions, such as changes in the surface structure of NMC, active lithium loss through anode SEI growth triggered by transition metal dissolution. Transition metal plating on the anode surface may also catalyze a transesterification reaction of the electrolyte, and enhanced electrolyte oxidation due to the restricted anodic stability of carbonate based electrolytes. The electrolytes described herein ameliorate these problems.

Ex. 3. NMC532 Cathode Structure After Cycling

The electrolyte played a significant role in dictating the extended cycling performance of the NMC/graphite cell at high voltages. To more deeply understand the impact of electrolyte on the cycled cathode material, the atomic structure of the pristine and the cycled NMC cathodes were examined after 1000 cycles in Gen 2 and fluorinated electrolyte by aberration corrected scanning transmission electron microscopy (ACSTEM). The degradation of the cycled cathodes was evaluated utilizing high angle annular dark field (HAADF) imaging and electron energy loss spectroscopy (EELS) analysis. Z-contrast atomic resolution HAADF images of a pristine NMC particle from [001] and [010] zone axis of hexagonal layered structure were obtained, confirmed the rhombohedral layered structure (R $\bar{3}$ m) of the pristine NMC. About 1-2 nm of cation disordered structure was observed at the surface of particles with [100] facet termination, which is a typical phenomenon in layered oxide cathode materials. However, after extensive cycling in Gen 2 electrolyte, intragranular cracks and surface fractures caused by the strain resulting from the layered to rock-salt phase transition were observed on the surface of particles, which is consistent with the SEM images.

HAADF imaging confirmed the vigorous phase transition from original rhombohedral layered structure to the rock-salt Fm $\bar{3}$ m structure for the Gen 2 cycled NMC. Formation of electrochemically inactive rock-salt phase is one of the main degradation mechanisms of layered oxide cathode materials. This phase transition is accompanied by oxygen release and reduction of transition metal. Surprisingly, the surface structure of the NMC cathode cycled in fluorinated electrolyte reassembled the surface structure of the pristine cathode by HAADF imaging. STEM images at various spots showed a well maintained arrangement of transition metals in the original layered structure and no any sign of extreme disorder and rock-salt phase transition as observed. The only noticeable difference from the pristine NMC was that the cation disorder span has increased from about 1-2 nm that was seen on pristine particle's side facet to about. 5-7 nm in the cycled cathode. Noteworthy, the cation disorder span is only about 2-3 nm on the surface of [001] facet termination, which agrees well with the previous observations of facet-dependent structural instability of layered oxide cathode materials.

EELS analysis were also performed on the pristine NMC and NMC cycled in Gen 2 electrolyte, as well as on NMC cycled in fluorinated electrolyte, as a function of distance to the surface of particles with 0.5 nm step size up to 4 nm distance from the surface. All profiles exhibited four main peaks at 530, 640, 780 and 880 eV, representing the O, Mn, Co, and Ni K-edge, respectively. The oxygen K-edge consists of a pre-edge peak corresponding to the transition of $O_{1s}$ state to $O_{2p}$ states hybridized with transition metal 3d states and can be used to quantify the valence of transition metals. The main peak also corresponds to the transition of electrons from $O_{1s}$ to $O_{2p}$ hybridized with transition metal 4 sp states. From the oxygen K-edge it can be visualized that a cation-disordered layer formed at approximately 1 nm from the surface of the sample giving rise to a shift in O K-edge pre-peak. This transition corresponds to a reduction in valence state of transition metals due to broken bonds of disordered TM cations with oxygen atoms, and can be used to evaluate the degradation extent of cathode materials after cycling.

The cation disorder could also be detected at 1-2 nm by EELS for the pristine cathode, there is a O k-edge pre-peak shift and reduction of transition metal cation has taken place. However, moving away by only 2 nm from the surface, there is no indication of transition metal reduction and disorder in the EELS spectra for the NMC cathode cycled in fluorinated electrolyte, while this value increased to 4-5 nm for the NMC cycled in Gen 2 electrolyte. These results are consistent with the STEM results discussed above, and the transition metal dissolution data, which is discussed below.

Ex. 4. Mn, Ni and Co Dissolution

The transition metal plating on the anode not only leads to severe electrolyte decomposition at the anode and consumption of active Li by side reactions, but also increases the anode impedance. The fluorinated electrolytes described herein ameliorate these problems.

During cycling, defects can develop in the cathode material, which also becomes more susceptible to HF attack. In a Li-ion battery, $LiPF_6$ is in chemical equilibrium with LiF and $PF_5$. The $PF_5$ can react with water, to yield HF. The fluorinated electrolyte undergoes less oxidation at with high oxidation potential values, relative to baseline Gen 2 electrolyte, which generates more HF and accelerates the loss of transition metal ions from the NMC electrodes.

Figure 1:
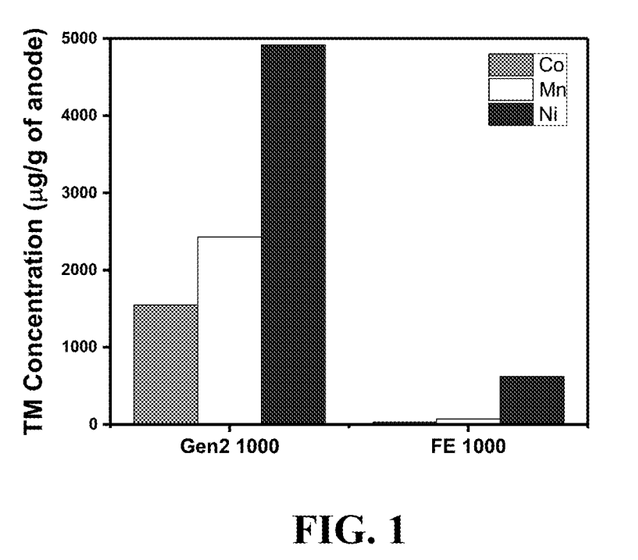
FIG. 1 provides graphs of transition metal (Ni, Mn, Co) deposition on graphite anodes from full cells comprising a NMC532 cathode cycled in conventional electrolyte comprising 1.2 M $LiPF_6$ in 3:7 w/w EC/DMC solvent (Gen 2; left set of data) and in a fluorinated electrolyte comprising 1.0 M $LiPF_6$ in 3:7 w/w DFEC/HFDEC solvent (FE; right set of data) after 1000 charge-discharge cycles measured by ICP-MS.

One of the reasons for accelerated capacity loss at high positive cutoff potentials and/or high temperatures is the dissolution of transition metals from NMC and their subsequent deposition on the graphite anode. To examine the extent of transition metal deposition on the anode, ICP-MS was used to quantify the amount of deposited Ni, Mn, Co on harvested graphite anodes. Results for TM deposition on the Gen 2-cycled (left hand data set) and FE-cycled (right hand data set) anodes at the 1000th cycle are given in FIG. 1. The data in FIG. 1 quite clearly show that the concentrations of Ni, Mn and Co deposited on graphite electrodes cycled in the FE electrolyte were surprisingly lower than on the graphite electrode cycled in Gen-2 electrolyte.

Ex. 5. Performance of Cycled Electrode

In an attempt to deconvolute the impedance growth for the cycled cells after 1000 cycles, the cathode and anode were harvested from the cycled cells and separately reassembled in half cells coupled with lithium metal. The NMC532 electrode cycled in Gen 2 electrolyte suffered from low charge/discharge capacity (about 150 mAh/g) compared with the pristine cathode, and could not recover the full capacity even at a slow C/20 rate. Surprisingly, the NMC532 electrode cycled in the FE electrolyte was able to achieve close to 200 mAh/g at C/20 rate and maintained high C-rate capability. A large capacity loss from the cathode cycled in Gen 2 electrolyte indicated that high voltage cycling leads to not only active lithium loss, but also a cathode surface structure change due to the transition metal dissolution and oxygen evolution. As discussed in more detail below; the surface structure of the NMC532 changed from a rhombohedral R $\overline{3}$m layered structure into a rock salt phase, Fm $\overline{3}$ m, which can be a solid solution of NiO and $Co_2O_3$. As a result, the Li has difficulty in being fed back to the reconstructed surface even under a low rate. The cathode cycled in fluorinated electrolyte shows similar rate performance under low to medium rate (C/20, C/10 and C/5) to the performance of a pristine cathode and most of the capacity loss can be fed back in the first few cycles (from 110 mAh/g to 194 mAh/g) when coupled with a capacity-infinity lithium metal anode, indicating the surface crystal structure of this cathode doesn't change dramatically and most of capacity loss is due to the loss of active Li from the graphite anode side.

A significant difference in rate capability from the pristine graphite anode was observed for the anode cycled in Gen2 electrolyte, indicating a drastic increase in interfacial impedance. Metal plating and side reactions on the graphite surface increased the impedance of the anode side and results in the poor aged anode half-cell rate performance. In contrast, the rate capability of aged or fresh anode half-cells in the DFEC/HFDEC electrolyte and the half-cell rate capability were almost unchanged, indicating that the anode aged in fluorinated electrolyte can maintain a stable surface even after 1000 cycles. The fluorinated electrolyte also appears to efficiently suppress electrolyte breakdown and transition metal plating on the anode surface, which is in good agreement with the scanning electron microscope (SEM), ICP-MS and EIS analysis showing that the fluorinated electrolyte-aged anode shows a clean surface and low impedance.

The results described herein demonstrate that a highly fluorinated electrolyte outperforms than the conventional Gen 2 electrolyte in a high voltage NMC532/graphite full cell, implying this electrolyte is not only oxidatively stable at the charged cathode surface, but also is stable on the reducing graphite anode surface due to a more robust SEI. Interestingly, the dQ/dV profiles for both electrolyte cells were substantially the same. The Li half-cell capacity of the graphite anode cycled in Gen 2 electrolyte suffered considerably greater capacity loss over about 120 cycles (C/20 for lithiation and delithiation, cutoff voltage: about 1.5 to about 0.01 V) compared to the Li half-cell capacity of the graphite anode cycled in the FE-3 electrolyte. To investigate its stability on graphite, Li/graphite half cells were first studied. SEI formation during the first lithiation process starts at around 0.6 V vs $Li^+/Li$ for the Gen 2 electrolyte, while the FE-3 electrolyte starts reduction on the graphite anode at about 1.4 V vs $Li^+/Li$ and continues to the lower potentials.

XPS analysis indicates that the SEI formed by the FE electrolyte is rich in LiF and no transition metal were detectable, while the Gen 2-formed SEI lacks LiF and is rich in transition metals especially Mn, which dissolved into the electrolyte from the cathode and migrated and deposited on the surface of the graphite. During repeated lithiation processes at the anode, the deposited Mn enables parasitic reactions of electrolyte and lithiated graphite leading the loss of active lithium. This was confirmed by the morphology of the cycled graphite anodes and cathode observed by SEM, where the anode cycled in Gen2 electrolyte showed heavy deposition of organic compounds and loss of integrity. In contrast, the anode cycled with FE electrolyte showed very little decomposition and clean particle shapes, which is surprising considering the FE electrolyte's high reactivity toward reduction.

Figure 2:
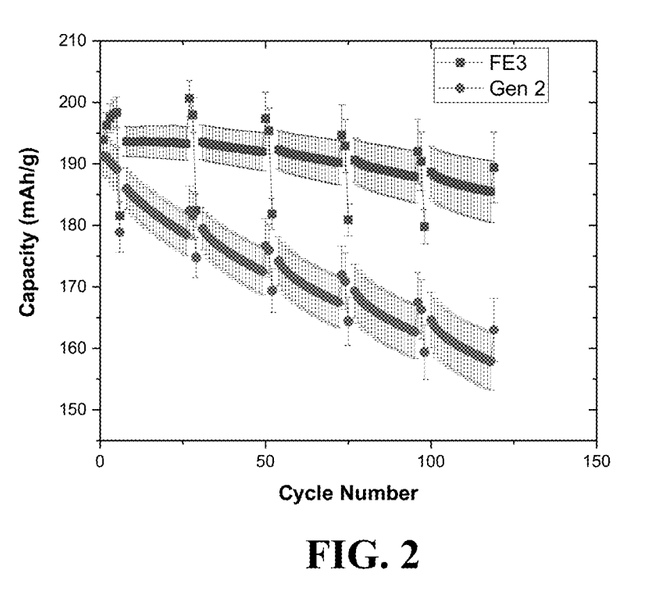
FIG. 2 provides graphs of capacity versus cycle number for cells comprising Gen 2 electrolyte or fluorinated electrolyte (labeled FE3) and a pristine NMC532 cathode coupled with a graphite anode that had been previous cycled in FE3 electrolyte (C/20 for lithiation and delithiation, cutoff voltage: 1.5-0.01 V).

The anode maintains its integrity despite the fact that TM still dissolves in the FE cycled electrolyte, albeit at a significantly lower level. This clearly indicates that the SEI formed by FE solvent is relatively immune to the attack by TMs after its deposition. To further confirm the resilience of the SEI, a pristine NMC532 cathode was coupled with a FE-cycled graphite anode and this combination of electrodes was then extensively cycled using the same protocol (see FIG. 2). Surprisingly, the cell exhibited superior coulombic efficiency and capacity retention. Contrary to the common knowledge that fluorinated electrolyte is not stable on the graphite anode, it turns out the resilient SEI formed by the FE is a major contributor to the improved cycling performance under high voltage conditions. The FE electrolyte described herein demonstrates for the first time that fluorinated electrolyte not only can stabilize the cathode at high voltages, but can also sufficiently passivate the anode providing protection from side reactions on the lithiated graphite anode.

Ex. 6. Evaluation of Different DFEC:HFDEC Ratios

Figure 3:
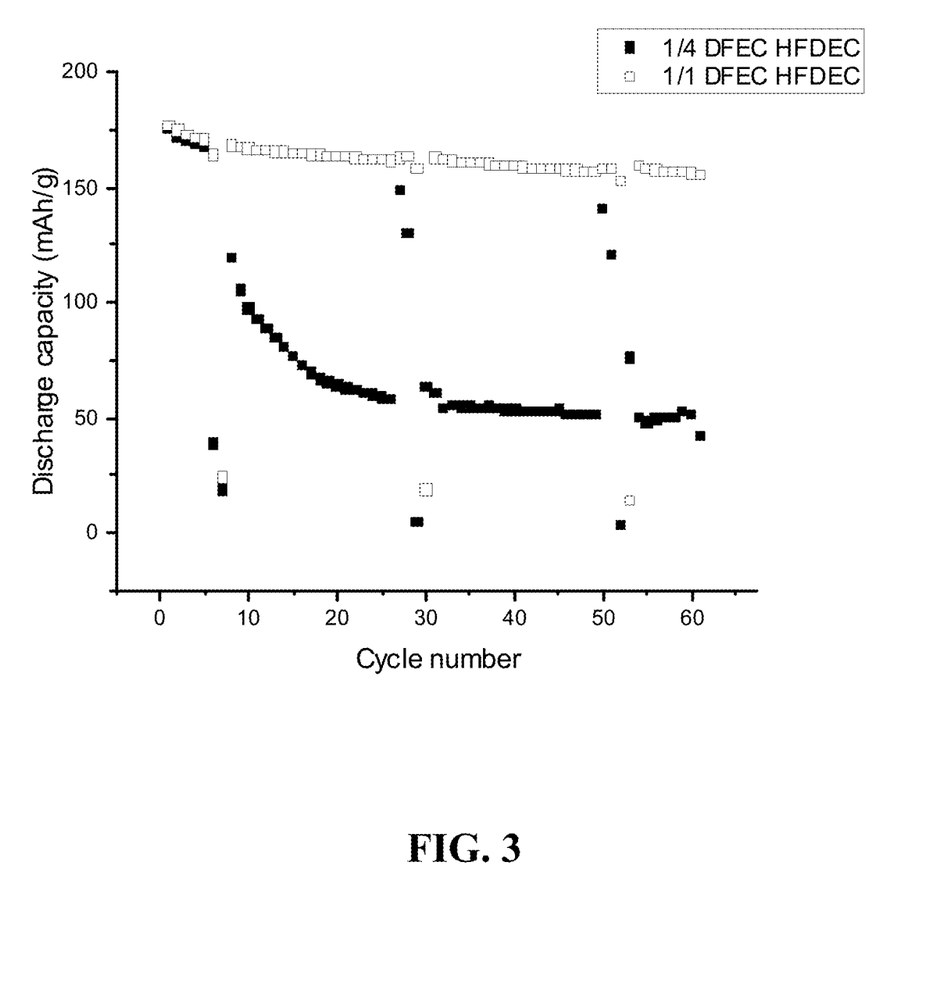
FIG. 3 provides graphs of capacity versus cycle number for cells cycled in electrolytes comprising two different ratios of DFEC/HFDEC solvent.

Electrolytes comprising 1.0 M $LiPF_6$ in 1:4 (w/w) and 1:1 (w/w) DFEC:HFDEC were evaluated in graphite (anode)/ $LiNi_{0.5}Mn_{0.3}Co_{0.2}O_2$ (cathode) cells as described in Ex. 2, above. The cells were cycled at 30° C. between 3.0 V and 4.5 V at a cycling rate of C/10 for 5 cycles and then at C/3 for 60 cycles with a 3-hour hold at 4.5V. Graphs of discharge capacity versus cycle number are shown in FIG. 3. The discharge capacity results for the cell comprising 1:1 DFEC: HFDEC electrolyte were surprisingly superior to the results for the cell comprising 1:4 DFEC:HFDEC electrolyte.

Ex. 7. Evaluation of 3:7 (w/w) DFEC:FEMC Electrolyte

Figure 4:
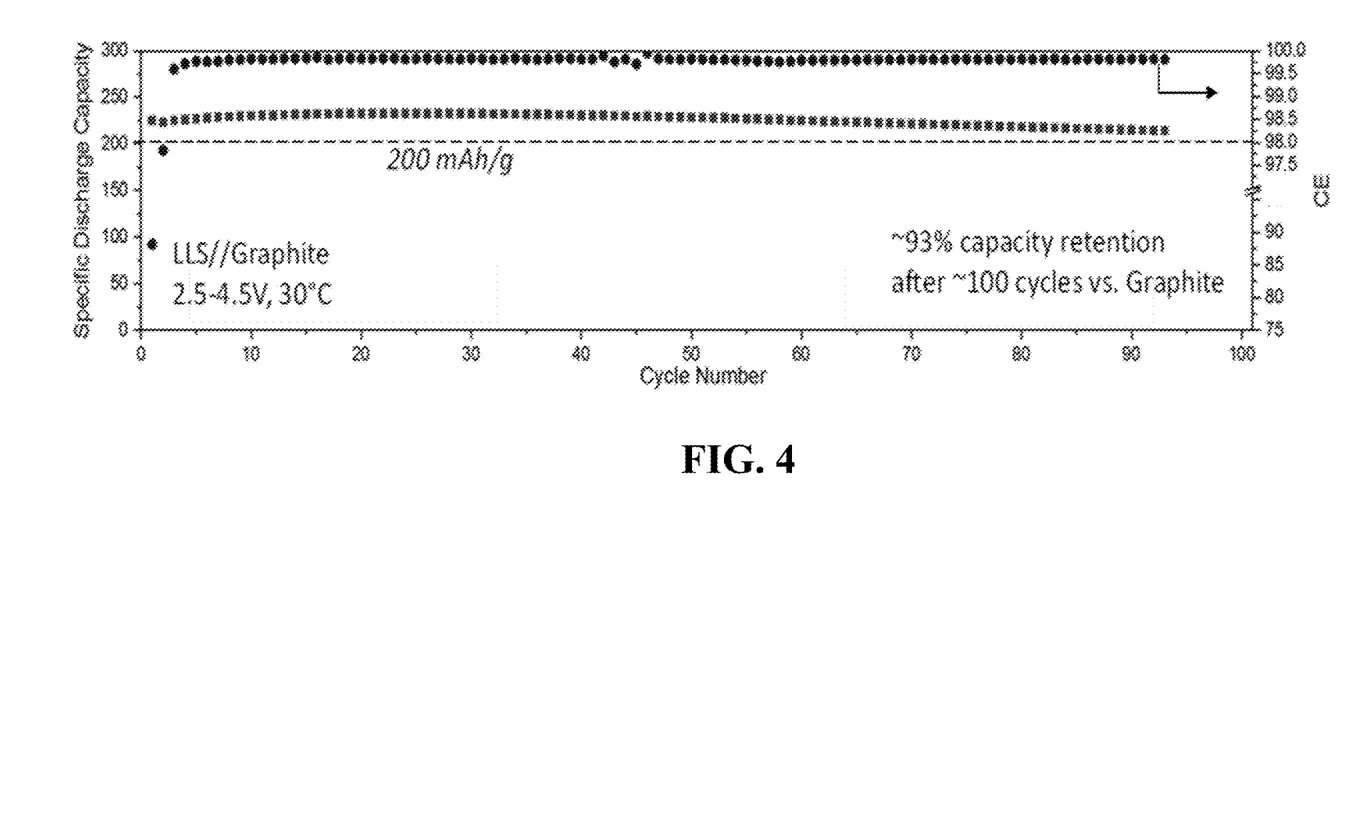
FIG. 4 provides graphs of capacity versus cycle number (left vertical axis) and coulombic efficiency (CE, right vertical axis) for a cell cycled with an electrolyte comprising 3:7 (w/w) DFEC/FEMC solvent.

A graphite anode that had been pre-cycled in an electrolyte comprising 1.0M $LiPF_6$ in 3:7 (w/w) DFEC:FEMC (preformed graphite anode) was coupled with a pristine 'layered-layered-spinel' (LLS) cathode was evaluated by cycling in 1.0 M $LiPF_6$ in 3:7 (w/w) DFEC:FEMC electrolyte. The LLS comprised about 85% $0.25Li_2MnO_3 \cdot 0.75LiMn_{0.375}Ni_{0.375}Co_{0.25}O_2$, with a targeted 15% spinel component, e.g., $Li_2M'_2O_4$ wherein M'=a combination of Mn, Ni, and Co) as described in Long et al. (*Journal of The Electrochemical Society,* 161 (14) A2160-A2167 (2014)). The cell was cycled between 2.5 V and 4.5 V at 30° C., and at a cycling rate of ~C/3 for >90 cycles. Graphs of discharge capacity versus cycle number (left vertical axis) and coulombic efficiency (CE, right vertical axis) are shown in FIG. 4. The excellent observed cycling performance (about 93% capacity retention after over 90 cycles and a discharge capacity of about 210 to 225 mAh/g), and coulombic efficiency of >99.5% indicate a high level of voltage stability for the electrolyte on the cathode and high compatibility with the graphite cathode. Similar results were obtained with the pre-formed graphite anode and a NMC532 cathode in 3:7 (w/w) DFEC:FEMC electrolyte.

Ex. 8. Additional Examples with Metallic Lithium Anode

Figure 5:
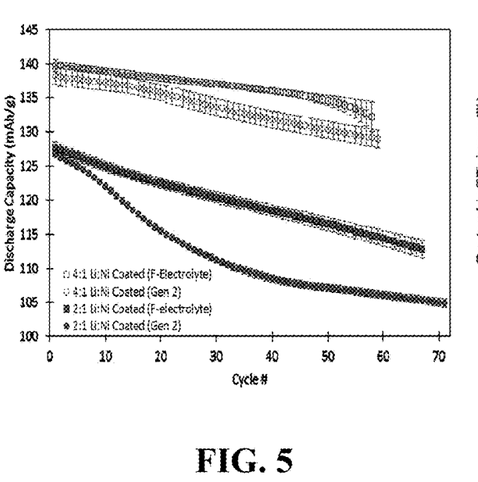
FIG. 5 provides plots of discharge capacity versus cycle number for cells with a lithium anode and a fluorinated electrolyte compared to Gen 2 electrolyte.
Figure 6:
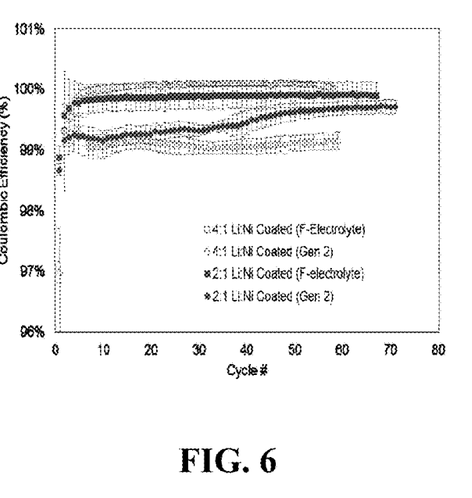
FIG. 6 provides plots of coulombic efficiency for cells with a lithium anode and a fluorinated electrolyte compared to Gen 2 electrolyte.

Cells comprising a metallic lithium anode and cathodes comprising two different Ni surface-doped $Li_{1.06}Mn_{0.12}$ $Co_{0.82}O_2$ materials (labeled 4:1 and 2:1, referring to nickel doping levels) in 1.0 M $LiPF_6$ DFEC/HFDEC (3:7) electrolyte (F-electrolyte), or Gen 2 electrolyte (for comparison), were cycled at 30° C. (C/3 rate) for about 58-70 cycles. FIG. 5 provides plots of discharge capacity versus cycle number for the tested cells. As shown in FIG. 5, the fluorinated electrolyte shows an unexpectedly higher initial capacity and surprisingly higher capacity retention than observed with the Gen 2 comparison electrolyte. FIG. 6 provides plots of coulombic efficiency for the cells. The F-electrolyte cells exhibited a higher initial coulombic efficiency than the cells cycled in Gen 2 electrolyte. The results indicate that the F-electrolyte/Lithium interphase is more well passivated than the Gen 2/Lithium interphase.

Figure 7:
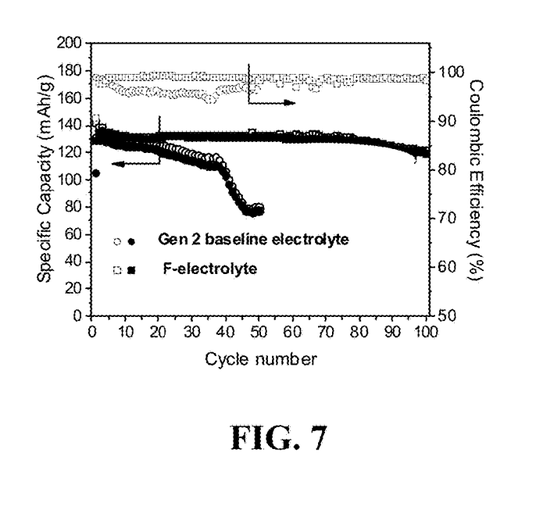
FIG. 7 provides plots of specific capacity versus cycle number (left vertical axis) and coulombic efficiency (right vertical axis) for cells with a lithium anode and a fluorinated electrolyte compared to Gen 2 electrolyte.

Cells comprising a metallic lithium anode and a cathode comprising a Ni/Mn Spinel $LiNi_{0.5}Mn_{1.5}O_4$ material in 1.0 M $LiPF_6$ DFEC/HFDEC (3:7) electrolyte (F-electrolyte), or Gen 2 electrolyte (for comparison), were cycled at room temperature (C/3 rate) for up to about 100 cycles. FIG. 7 provides plots of specific capacity versus cycle number (left vertical axis) and coulombic efficiency (right vertical axis) for the tested cells. The data in FIG. 7 demonstrate that the fluorinated electrolyte cell performed much better than the Gen 2 comparison cell, showing improved oxidation stability on the lithium-nickel-manganese oxide cathode and passivation of the Li metal anode with a stable SEI.

Ex.9. Exemplary Electrochemical Cell and Battery

Figure 8:
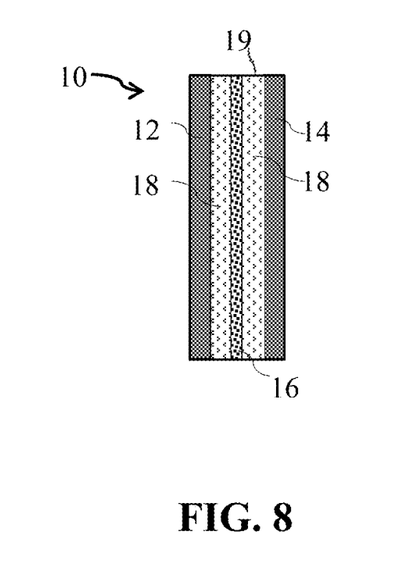
FIG. 8 depicts a schematic representation of an electrochemical cell.
Figure 9:
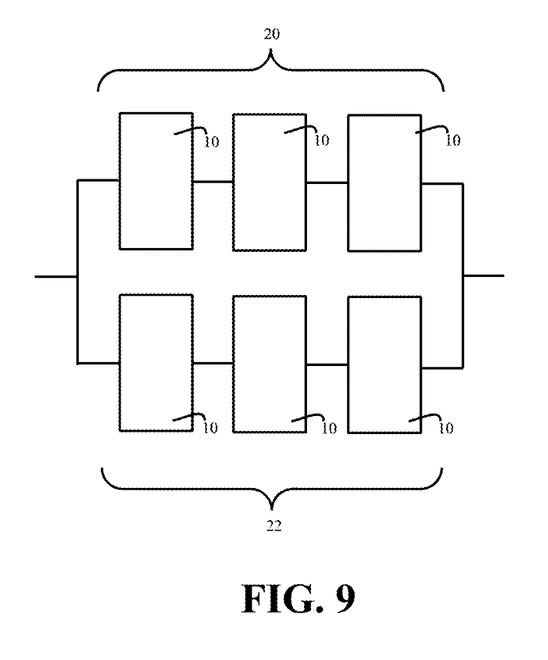
FIG. 9 depicts a schematic representation of a battery consisting of a plurality of cells connected electrically in series and in parallel.

FIG. 8 schematically illustrates a cross-sectional view of lithium electrochemical cell 10 comprising cathode 12, and anode 14, with porous separator membrane 16 therebetween. Electrolyte 18, comprising a solution of a lithium salt in a non-aqueous fluorinated solvent as described herein contacts electrodes 12 and 14 and separator 16. The electrodes, separator and electrolyte are sealed within housing 19. Cathode 12 can comprise, e.g., a lithium metal oxide active component such as a layered lithium nickel-manganese-cobalt oxide, or any other active lithium metal oxide material, while anode 14 can comprise e.g., metallic lithium, a carbon material (e.g., graphite), a silicon material, and the like. FIG. 9 schematically illustrates a lithium battery comprising a first cell bank 20 consisting of three series-connected electrochemical cells 10, and a second cell bank 22 consisting of three series-connected electrochemical cells 10, in which first bank 20 is electrically connected to second bank 22 in parallel.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The terms "consisting of" and "consists of" are to be construed as closed terms, which limit any compositions or methods to the specified components or steps, respectively, that are listed in a given claim or portion of the specification. In addition, and because of its open nature, the term "comprising" broadly encompasses compositions and methods that "consist essentially of" or "consist of" specified components or steps, in addition to compositions and methods that include other components or steps beyond those listed in the given claim or portion of the specification. Recitation of ranges of values herein are merely intended to serve as a shorthand method of referring individually to each separate value falling within the range, unless otherwise indicated herein, and each separate value is incorporated into the specification as if it were individually recited herein. All numerical values obtained by measurement (e.g., weight, concentration, physical dimensions, removal rates, flow rates, and the like) are not to be construed as absolutely precise numbers, and should be considered to encompass values within the known limits of the measurement techniques commonly used in the art, regardless of whether or not the term "about" is explicitly stated. All methods described herein can be performed in any suitable order unless otherwise indicated herein or otherwise clearly contradicted by context. The use of any and all examples, or exemplary language (e.g., "such as") provided herein, is intended merely to better illuminate certain aspects of the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The embodiment of the invention in which an exclusive property or privilege is claimed are defined as follows:

1. A non-aqueous electrolyte for a lithium electrochemical cell comprising a lithium salt dissolved in a non-aqueous solvent composition consisting of a 1,2-difluoroethylene carbonate and a fluoro-substituted dialkyl carbonate in a respective weight ratio of about 1:3 to about 1:1; wherein the lithium salt is selected from the group consisting of lithium bis(trifluoromethanesulfonyl)imide (LiTFSI), lithium 2-trifluoromethyl-4,5-dicyanoimidazolate (LiTDI), lithium 4,5-dicyano-1,2,3-triazolate (LiDCTA), lithium trifluoromethanesulfonate (LiTf), lithium perchlorate (LiClO$_4$), lithium bis(oxalato)borate (LiBOB), lithium difluoro(oxalato)borate (LiDFOB), lithium tetrafluoroborate (LiBF$_4$), lithium hexafluorophosphate (LiPF$_6$), lithium thiocyanate (LiSCN), lithium bis(fluorosulfonyl)imide (LiFSI), lithium bis(pentafluoroethylsulfonyl)imide (LiBETI), lithium tetracyanoborate (LiB(CN)$_4$), and lithium nitrate.

2. The electrolyte of claim 1, wherein the 1,2-difluoroethylene carbonate and the fluoro-substituted dialkyl carbonate are present in the composition in a respective weight ratio of about 3:7 to about 1:1.

3. The electrolyte of claim 1, wherein the 1,2-difluoroethylene carbonate comprises trans-1,2-difluoroethylene carbonate.

4. The electrolyte of claim 1, wherein the fluoro-substituted dialkyl carbonate comprises one or more compound selected from the group consisting of bis(2,2,2-trifluoroethyl) carbonate and 2-fluoroethyl methyl carbonate.

5. The electrolyte of claim 1, wherein the lithium salt is LiPF$_6$.

6. The electrolyte of claim 1, wherein the lithium salt is present in the electrolyte at a concentration in the range of about 0.1 M to about 3 M.

7. A non-aqueous electrolyte for a lithium electrochemical cell comprising about 0.5 M to about 2 M solution of an electrolyte salt consisting of LiPF$_6$ dissolved in a non-aqueous solvent composition consisting of a 1,2-difluoroethylene carbonate and a fluoro-substituted dialkyl carbonate in a respective weight ratio of about 1:3 to about 1:1.

8. The electrolyte of claim 7, wherein the 1,2-difluoroethylene carbonate comprises trans-1,2-difluoroethylene carbonate.

9. The electrolyte of claim 7, wherein the fluoro-substituted dialkyl carbonate comprises one or more compound selected from the group consisting of bis(2,2,2-trifluoroethyl) carbonate and 2-fluoroethyl methyl carbonate.

10. An electrochemical cell comprising an anode, a cathode, and a lithium-containing electrolyte of claim 1 contacting the anode and the cathode.

11. The electrochemical cell of claim 10, wherein the anode comprises metallic lithium or graphite and the cathode comprises a lithium metal oxide.

12. A battery comprising a plurality of electrochemical cells of claim 10, electrically connected in series, in parallel, or in both series and parallel.

13. An electrochemical cell comprising an anode, a cathode, and a lithium-containing electrolyte of claim 7 contacting the anode and the cathode.

14. The electrochemical cell of claim 13, wherein the anode comprises metallic lithium or graphite and the cathode comprises a lithium metal oxide.

15. A battery comprising a plurality of electrochemical cells of claim 13, electrically connected in series, in parallel, or in both series and parallel.

* * * * *